US009281706B2

(12) United States Patent
McFarthing

(10) Patent No.: US 9,281,706 B2
(45) Date of Patent: Mar. 8, 2016

(54) OBJECT DETECTION IN A WIRELESS CHARGING FIELD

(71) Applicant: QUALCOMM TECHNOLOGIES INTERNATIONAL, LTD., Cambridge (GB)

(72) Inventor: Anthony Lawrence McFarthing, Cambridgeshire (GB)

(73) Assignee: Qualcomm Technologies International Ltd., Cambridge (GB)

(*) Notice: Subject to any disclaimer, the term of this patent is extended or adjusted under 35 U.S.C. 154(b) by 149 days.

(21) Appl. No.: 14/162,095

(22) Filed: Jan. 23, 2014

(65) Prior Publication Data

US 2015/0207340 A1 Jul. 23, 2015

(51) Int. Cl.
*H02J 7/00* (2006.01)
*H02J 7/02* (2006.01)

(52) U.S. Cl.
CPC ............ *H02J 7/007* (2013.01); *H02J 7/025* (2013.01); *H02J 7/0052* (2013.01)

(58) Field of Classification Search
CPC ........................................................ H02J 7/025
USPC ............................................................ 320/108
See application file for complete search history.

(56) References Cited

U.S. PATENT DOCUMENTS

| 2009/0003490 | A1* | 1/2009 | Nadler et al. | 375/316 |
|---|---|---|---|---|
| 2012/0139356 | A1 | 6/2012 | Jung | |
| 2014/0015478 | A1* | 1/2014 | Von Novak | 320/108 |
| 2014/0015546 | A1* | 1/2014 | Frederick | 324/642 |
| 2014/0173690 | A1* | 6/2014 | Ekberg et al. | 726/3 |
| 2014/0225628 | A1* | 8/2014 | Yoon et al. | 324/654 |
| 2014/0335490 | A1* | 11/2014 | Baarman et al. | 434/236 |
| 2015/0042288 | A1* | 2/2015 | Ishii et al. | 320/135 |
| 2015/0194814 | A1* | 7/2015 | Taylor et al. | 320/108 |

FOREIGN PATENT DOCUMENTS

| EP | 2608352 | 6/2013 |
|---|---|---|
| WO | 2012/142184 | 10/2012 |
| WO | 2013/089311 | 6/2013 |

OTHER PUBLICATIONS

Search Report issued Nov. 20, 2014 in corresponding GB1413033.0.
Kuyvenhoven, et al., "Development of a Foreign Object Detection and Analysis Method for Wireless Power Systems", Wireless Power Consortium, 2011; downloaded Nov. 19, 2014 from http://www-wirelesspowerconsortium.com/data/downloadables/6/9/1/pses-2011-fod-development.pdf.

* cited by examiner

*Primary Examiner* — Suchin Parihar
(74) *Attorney, Agent, or Firm* — Procopio Cory Hargreaves & Savitch LLP

(57) ABSTRACT

Methods and devices are disclosed including a wireless charging method comprising transmitting a wireless charging signal, monitoring at least one of an amplitude and a phase of the wireless charging signal, determining whether the at least one of an amplitude and phase is within a predetermined range of at least one predetermined value and, if it is determined that the at least one of an amplitude and phase is not within the predetermined range of the at least one predetermined value, stopping transmission of the wireless charging signal.

22 Claims, 2 Drawing Sheets

OBJECT DETECTION IN A WIRELESS CHARGING FIELD

TECHNICAL FIELD

Embodiments of the invention described herein relate to wireless charging of electronic devices, for example devices that are near-field communications (NFC) capable devices, and in particular to detection of parasitic objects in a wireless charging field.

BACKGROUND

Wireless charging of an electronic device is a desirable convenience as the requirement to physically connect the device to a wire, dock or other physical component while charging is removed.

Some devices are capable of communicating with each other according to the near-field communication (NFC) standard or radio frequency identification (RFID) standard. According to these standards, one device (a reader) can communicate with another device (a tag). The tag may also harvest power from an electromagnetic signal transmitted by the reader, so that the tag may not require any other power source. The tag device has an antenna that is resonant at a frequency on which NFC (or RFID) communications are transmitted from the reader in order to be able to receive as much energy as possible from the signal. This allows the tag to extract as much energy as possible for powering the device as well as ensuring communication reliability.

SUMMARY OF EMBODIMENTS OF THE INVENTION

According to a first aspect of embodiments of the invention there is provided a wireless charging method comprising transmitting a wireless charging signal, monitoring at least one of an amplitude and a phase of the wireless charging signal, determining whether the at least one of an amplitude and phase is within a predetermined range of at least one predetermined value and, if it is determined that the at least one of an amplitude and phase is not within the predetermined range of the at least one predetermined value, stopping transmission of the wireless charging signal.

According to a second aspect of embodiments of the invention there is provided a wireless charger, comprising a transmitter for transmitting a wireless charging signal, a receiver and a processor, wherein the processor is arranged to monitor at least one of an amplitude and a phase of the wireless charging signal received by the receiver, determine whether the at least one of an amplitude and phase is within a predetermined range of at least one predetermined value and, if it is determined that the at least one of an amplitude and phase is not within the predetermined range of the at least one predetermined value, stopping transmission of the wireless charging signal.

According to a third aspect of embodiments of the invention there is provided a wireless charger device comprising means for transmitting a wireless charging signal, means for monitoring at least one of an amplitude and a phase of the wireless charging signal, means for determining whether the at least one of an amplitude and phase is within a predetermined range of at least one predetermined value, and means for stopping transmission of the wireless charging signal if it is determined that the at least one of an amplitude and phase is not within the predetermined range of the at least one predetermined value.

According to a fourth aspect of embodiments of the invention, there is provided a wireless charging method, comprising transmitting a wireless charging signal, detecting a device within range of the wireless charging signal, stopping transmission of the wireless charging signal, performing a search for devices, and if no devices are found that could be damaged by the wireless charging signal, resuming transmission of the wireless charging signal.

According to a fifth aspect of embodiments of the invention, there is provided a wireless charger, comprising, means for transmitting a wireless charging signal, means for detecting a device within range of the wireless charging signal, means for stopping transmission of the wireless charging signal, means for performing a search for devices, and means for resuming transmission of the wireless charging signal if no devices are found that could be damaged by the wireless charging signal.

BRIEF DESCRIPTION OF THE FIGURES

Embodiments of the invention will now be described by way of example only, in which.

DETAILED DESCRIPTION OF EMBODIMENTS OF THE INVENTION

Some NFC or RFID capable devices may be associated with a battery. The battery may be present for example to power the device when not enough power is being extracted from a signal transmitted from a reader (or other NFC or RFID device), or when no such signal is being transmitted. Additionally or alternatively, for example, the NFC or RFID device may be associated with another device such as a mobile telephone that is typically powered by a battery. The device is thus NFC or RFID capable.

Specific embodiments described below relate to NFC although the principles disclosed herein may also be applied to other wireless charging and communication technologies (for example, RFID).

NFC Wireless Charging (NFC WC) could be used to charge NFC or RFID capable devices that also include a battery. An NFC charging device, which in some cases may also be an NFC reader, may transmit a wireless charging signal on a frequency typically used for NFC communications, such as 13.56 MHz. A wireless charging signal is a signal with a power higher than that typically expected from a reader device when powering tags for communication purposes and not for charging a battery. An example of the power of a wireless charging signal is 10 W although other power levels are possible. NFC tags are typically designed to operate at relatively low input powers and low voltages. The large voltages that can be produced in NFC tags by an NFC wireless charging signal could cause the tags to be damaged or even cause a fire risk, particularly in NFC or RFID devices that are not capable of being wirelessly charged using a wireless charging signal of a particular frequency, or are not designed to be able to operate or at least prevent damage in a wireless charging field. Thus, there is a need to protect NFC tags and other NFC or RFID devices from negative effects of a wireless charging signal transmitted at particular frequencies, for example 13.56 MHz.

Figure 1:
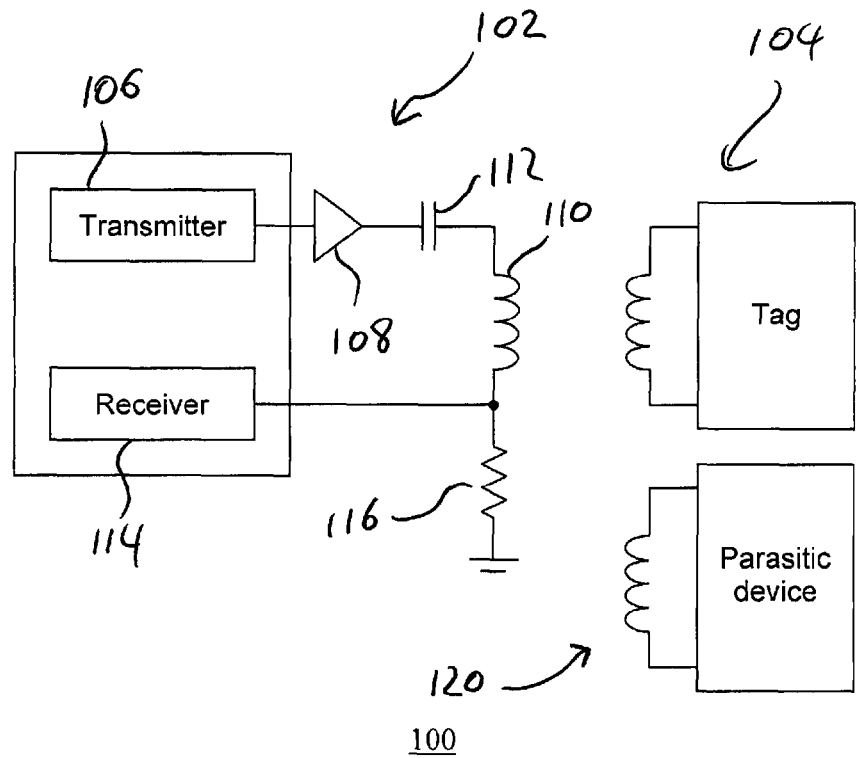
FIG. 1 shows an example of a wireless charging signal including at least one parasitic device.

FIG. 1 shows an example of a wireless charging system 100. The system 100 includes a charger device 102 and a device 104 being charged by a wireless charging signal transmitted by the charger 104. The device 104 may be, for example, an NFC or RFID tag. The charger 102 includes a transmitter 106 and power amplifier 108 to supply a signal to be transmitted to an antenna 110 via a matching capacitor 112. The charger 102 also includes a receiver 114 that monitors the voltage across a load resistance 116 connected between the antenna 110 and ground.

In some embodiments, the presence of a device close enough to the charger so that it can be charged could be detected by the charger in one of a number of ways. For example, communication by a predetermined method could be established (using NFC type communication on the charging frequency or another frequency, or using a totally different communication system such as Bluetooth), or a method according to embodiments of the invention to detect the presence of a parasitic object could be used to detect the presence of a potential device and then the charger could try to initiate a charging session. In some embodiments, further communications between the charger and the device to be charged could establish further information such as, for example, whether the device as capable of being charged, whether the device wants to be charged, what the charging power level should be, and/or other information.

Once the charging session has been initialized, the charger 102 continuously transmits a wireless charging signal, for example a substantially pure tone at 13.56 MHz. To communicate with the device 104, the charger 102 may also amplitude modulate the wireless charging signal in a manner that is known to those skilled in the art. In addition, to communicate with the charger 102 (which may also be a reader device for example), the device 104 may load modulate the wireless charging signal.

Communications could be established between the charger and the target using a modulation format like ISO14443B which operates at a data rate of 106 kbps. The proposed method for parasitic detection is however completely agnostic of the method of communication.

It is desirable to determine whether any device (such as, for example, a NFC or RFID tag) moves into the wireless charging field such that it receives power from the wireless charging signal. The device may not be able to communicate with the charger 102 before the device is damaged or otherwise rendered inoperable by the wireless charging signal, particularly for example if the device is a passive NFC or RFID tag. Therefore, it is desirable to detect such devices as they approach or enter the wireless charging field. FIG. 1 shows such a device 120 in close proximity to the charger 102, though there may be more than one such device.

Figure 2:
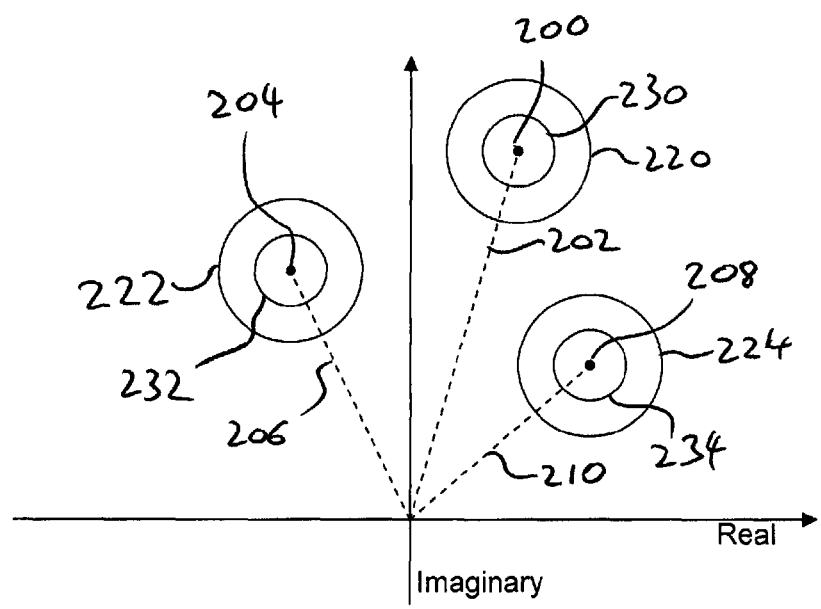
FIG. 2 shows examples of amplitude and phase of a wireless charging signal.

FIG. 2 shows an example of the amplitude and phase of a signal received by, for example, the receiver 114 of the charger 102 when the device 104 is present and there are no other devices or parasitic objects present. The received signal shows the amplitude and phase of the wireless charging signal being transmitted by the charger 102 and could in other embodiments be determined in other ways. When the wireless charging signal is being transmitted and there is no modulation (for example, there is no communication between the charger 102 and device 104, or during periods when neither device is modulating the wireless charging signal) the amplitude and phase of the signal define a first point 200 represented by a first vector 202. When the wireless charging signal is being amplitude modulated by the charger 102, the amplitude and phase switch between the first point 200 and a second point 204 defined by a second vector 206. When the wireless charging signal is being load modulated by the device 104, the amplitude and phase switch between the first point 200 and a third point 208 defined by a third vector 210. The points 200, 204 and 208 represent the received signal in the absence of any noise. However, noise may cause the detected amplitude and phase to define a point that is not exactly at one of the points 200, 204 and 208. The detected amplitude and phase of the received signal may also follow one or more paths between points 200 and 204, or a path between points 200 and 208.

A parasitic device could enter the wireless charging field. For example, a parasitic device may come close enough to the charger 102 to provide a measurable influence on the amplitude and/or phase of the received signal; this could be considered to be within range of the wireless charging signal. Alternatively the device may be within range of the signal if it is capable of using the signal for wireless charging, if the device could possibly be damaged by the signal, and/or if the device causes a measurable change to the amplitude and/or phase of the wireless charging signal. The received amplitude and/or phase of the signal (for example, as measured by a receiver) may change due to the presence of the parasitic device.

The parasitic device may be a NFC or RFID device 120 shown in FIG. 1 for example, or may alternatively be a device capable of communication using other technologies. The device may also be another object such as a metal ring that is incapable of NFC/RFID communications or even any kind of communication but is still capable of affecting the wireless charging signal. The change in amplitude and/or phase is caused by the change in load impedance as seen by the transmitter 106 in the charger 102. Therefore, the presence of such a device can be detected by monitoring the received amplitude and/or phase of the received signal.

Due to the presence of noise, embodiments of the present invention may determine that a parasitic device is present if the received amplitude and/or phase is outside of a predetermined range of one of the points 200, 204 and 208. For example, as shown in FIG. 2, the points 200, 204 and 208 are surrounded by circles 220, 222 and 224 respectively which represent a first predetermined range of the points. The influence of noise on the received signal can be reduced by for example averaging a plurality of samples of the received signal, or averaging a plurality of measurements of the amplitude and/or phase of the received signal. This may allow the predetermined range referred to above to be reduced, as represented for example by smaller circles 230, 232 and 234 around the points 200, 204 and 208 respectively. This may allow detection of parasitic devices to be more sensitive, for example detection of devices that are further away or that otherwise exert a smaller influence on the received signal. However, this may also increase the length of time that embodiments would take to react to such a detection.

Due to the presence of bandwidth limiting devices such as channel filters and the tuned antennas, there may be trajectories that exist between the events shown in FIG. 2. When the charger is amplitude modulating the signal it will know the optimum time at which to sample the signal so as not to sample a point between the points located at 200 and 204 but just at the points either 204 or 200. This is traditionally referred to as rejecting intersymbol interference. Such a method could be used by embodiments of the invention to ensure that points along the trajectory are not sampled and erroneously interpreted as indicating the presence of a parasitic device. Sampling the point 208 could be done by using data recovery circuitry in the receiver that will identify the sampling points at the zero ISI points so that points only at 208 are sampled.

When a parasitic device is detected, it is unknown whether the device is a NFC or RFID device and/or whether the device will be damaged by the wireless charging signal. Therefore, in embodiments of the invention when a parasitic device is detected transmission of the wireless charging signal is immediately ceased to avoid potentially damaging the parasitic device.

Figure 3:
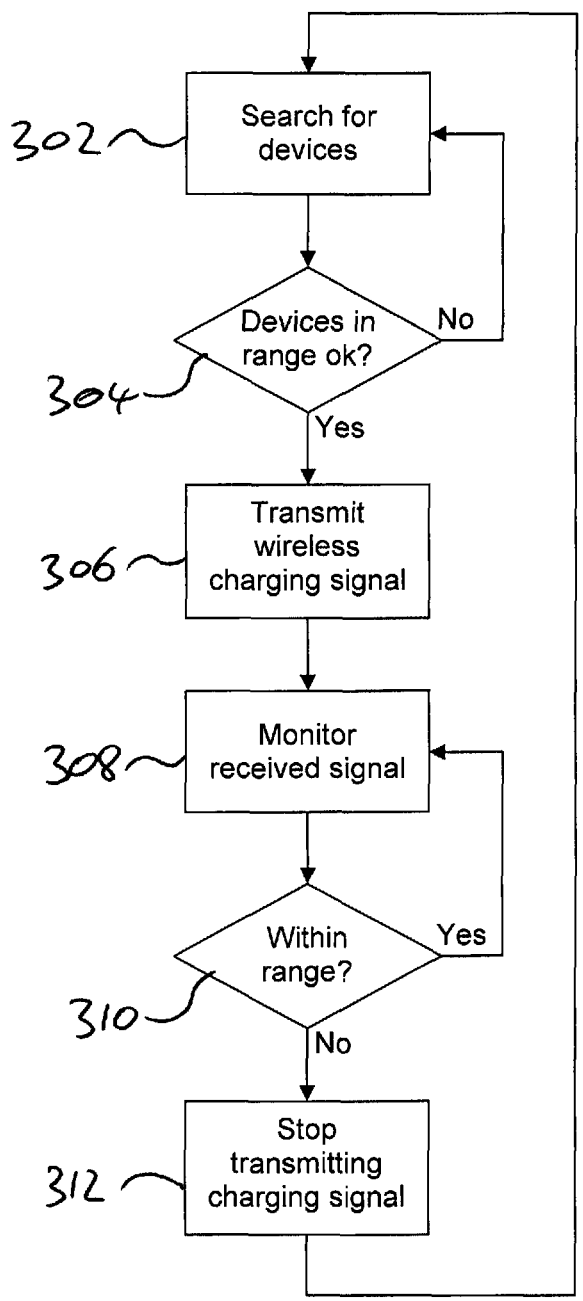
FIG. 3 shows an example of a wireless charging method.

FIG. 3 shows an example of a simplified wireless charging method or protocol 300 according to embodiments of the invention. The method 300 starts at step 302 where a wireless charger may be transmitting a low level signal like a typical NFC Reader would and is actively detecting for the presence of any device within the charging field. The charger may also from time to time transmit polling signals to invite a response from any NFC like tags in the field. Some targets may indeed be Tags not requiring charging and information transferred between Reader and Tag may indicate this. If the Tag is a device requiring charging then a protocol like that shown in 300 could be followed.

The communication between the Reader/Charger and Tag/Target may alternatively not be NFC like with communications modulated on the same carrier as a wireless charging signal, but may be on an alternative frequency and/or using different types of modulation to amplitude modulation. The alternative communications could be done by BT for example at 2.4 GHz or it could be done by WLAN (WiFi) at 2.4 or 5 GHz or by some other means.

The method shown in 300 does not show some interactions between the charger and device being charged but alternative embodiments could include further interactions. Examples of these include the device to be charged requesting a certain power level for the wireless charging signal from the charger, or other interactions. The details of these additional interactions may be implementation dependent and are not provided in the present discussion.

In step 304, the charger determines whether the devices are capable of wireless charging. For example, the devices may report in communications to the charger that they are capable of wireless charging using an NFC wireless charging signal at 13.56 MHz, or are not capable of charging (because for example they are not associated with batteries) but can withstand a wireless charging signal without being damaged. The wireless charging signal capabilities of the devices can in some embodiments be determined for example in responses to polls from the charger sent in step 302 or can be specified in further communications, either in response to queries from the charger or otherwise.

If any devices are found and they do not report that they can use or withstand the wireless charging signal, then it is possible that they could be damaged by the wireless charging signal. If this is the case then the method returns to step 302, and no wireless charging signal is transmitted.

If no devices are found, or any devices that are found are capable of using or withstanding the wireless charging signal, the method proceeds from step 304 to step 306 where transmission of the wireless charging signal is commenced. Next, at step 308, the amplitude and/or phase of the wireless charging signal (as determined for example using a receiver) is monitored. In step 310 it is determined whether the amplitude and/or phase are within a predetermined range of one or more predetermined values such as those represented by points 200, 204 and 208 in FIG. 2. If so then the method returns to step 308 where the amplitude and/or phase are again monitored, and if not the method proceeds to step 312 where transmission of the wireless charging signal is ceased as a "new" parasitic device may have been detected. Following step 312, the method returns to step 302 where a search for devices is again performed. Thus, for example, if the "new" device is capable of using or withstanding the wireless charging signal, or if the new device moves away from the charger again, wireless charging can resume.

A "new" parasitic device may not be RFID or NFC capable or may not be able to communicate at all for example in the case of a metal ring or other inductive object. In this case embodiments of the invention would not detect any new device in a search. Embodiments of the invention would assume that the "new" device would not be damaged by the wireless charging signal and transmission of the signal could resume.

It is possible and desirable in many applications for a charger to be able to support two or more Targets in the field. If another device enters the charging field requiring to be charged then initially the second device would be detected as a foreign object (parasitic device) and charging of the first device would be terminated, and no more than a low power signal (that is, for example, a signal at a power typical of NFC communications that does not charge devices) would then be transmitted from the charger to remove any possibility of damage to any third party device including the new second device. Communications with the original device would be continued while trying to establish communication with the second device. (The protocols may in some embodiments use addresses for the targets so that messages sent would be distinguishable by the targets.)

The presence of a second target in the charging field will change the positions of the constellation points as represented in FIG. 2 so a new set of points will need to be established by the receiver. Assuming the targets are static in the field the receiver will determine the new locations (200, 204 and 208) for the first device in the IQ plane. In addition there will be a fourth location corresponding to communication from the second target (due to, for example, load modulation by the second device). The wireless charger may also store an address corresponding to each location to indicate to which device or devices the location corresponds.

The receiver may update its own internal records or log of the new IQ locations. Power of the signal from the wireless charger could then be increased to a level that is compatible with both targets (for example, if one device requests a first power level and the other device requests a second power level, the lower of those power levels could be selected for the wireless charging signal). One of the devices being charged may be required to control the charging power received and possibly divert the power away from the charging circuit if the wireless charging signal is higher than what the device requires or is capable of handling, such that in some cases received power may be wasted in a dummy load.

In some embodiments, the power level from the charger could be changed in accordance with instructions from the devices being charged. In this case, the IQ locations established previously will also change. The charger's record or log will then need to be updated. The charger will always or periodically be monitoring the IQ locations of the signal at the charger's receiver against the log. If any difference is detected as described earlier then the charger will assume another device or parasitic object has entered the field and will take corresponding action such as reducing the power transmitted, terminating transmission of the wireless charging signal and the like.

Although methods, devices and electronic components have been disclosed in the context of certain preferred embodiments and examples, it will be understood by those skilled in the art that this disclosure extends beyond the specifically disclosed embodiments to other alternative embodiments and/or uses and obvious modifications and equivalents thereof. In addition, while several variations have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the disclosed embodiments. Thus, it is intended that the scope of the present invention herein disclosed should not be limited by the particular disclosed embodiments described above, but should be determined only by a fair reading of the claims that follow.

What is claimed is:

1. A wireless charging method comprising:
   transmitting a wireless charging signal;
   monitoring at least one of an amplitude and a phase of the wireless charging signal;
   determining whether the at least one of an amplitude and phase is within a predetermined range of at least one predetermined value; and
   if it is determined that the at least one of an amplitude and phase is not within the predetermined range of the at least one predetermined value, stopping transmission of the wireless charging signal.

2. The method of claim 1, further comprising, after stopping transmission of the wireless charging signal:
   detecting whether there are any devices within range of the wireless communication signal that may be damaged by the wireless charging signal; and
   if no such devices are detected, resuming transmission of the wireless charging signal.

3. The method of claim 2, wherein the step of detecting comprises:
   searching for devices within range of the wireless communication signal; and
   if one or more devices are found in the search, determining the wireless charging capability of those devices.

4. The method of claim 3, wherein at least one of the steps of searching and determining are performed using NFC communications.

5. The method of claim 1, wherein the at least one predetermined value comprises at least two predetermined values.

6. The method of claim 5, wherein the at least one predetermined value comprises at least three predetermined values, wherein a first one of the predetermined values corresponds to the unmodulated wireless charging signal, a second one of the predetermined values corresponds to the wireless charging signal load modulated by a device being charged by the wireless charging signal, and a third one of the predetermined values corresponds to the wireless charging signal amplitude modulated by a transmitter of the wireless charging signal.

7. The method of claim 1, wherein the step of determining comprises calculating an average of a plurality of values of the at least one of the amplitude and phase of the wireless charging signal.

8. The method of claim 1, wherein monitoring the wireless charging signal comprises receiving the wireless charging signal by a receiver that is co-located with a transmitter of the wireless charging signal.

9. A wireless charger, comprising:
   a transmitter for transmitting a wireless charging signal;
   a receiver; and
   a processor arranged to:
      monitor at least one of an amplitude and a phase of the wireless charging signal received by the receiver;
      determine whether the at least one of an amplitude and phase is within a predetermined range of at least one predetermined value; and
      if it is determined that the at least one of an amplitude and phase is not within the predetermined range of the at least one predetermined value, stopping transmission of the wireless charging signal.

10. The wireless charger of claim 9, wherein the processor is arranged to, after stopping transmission of the wireless charging signal:
    detect whether there are any devices within range of the wireless communication signal that may be damaged by the wireless charging signal; and
    if no such devices are detected, cause the transmitter to resume transmission of the wireless charging signal.

11. The method of claim 10, wherein the processor is arranged to detect whether there are any devices within range of the wireless communication signal by:
    searching for devices within range of the wireless communication signal; and
    if one or more devices are found in the search, determining the wireless charging capability of those devices.

12. The wireless charger of claim 11, wherein at least one of the steps of searching and determining are performed using NFC communications.

13. The wireless charger of claim 9, wherein the at least one predetermined value comprises at least two predetermined values.

14. The wireless charger of claim 13, wherein the at least one predetermined value comprises at least three predetermined values, wherein a first one of the predetermined values corresponds to the unmodulated wireless charging signal, a second one of the predetermined values corresponds to the wireless charging signal load modulated by a device being charged by the wireless charging signal, and a third one of the predetermined values corresponds to the wireless charging signal amplitude modulated by a transmitter of the wireless charging signal.

15. The wireless charger of claim 9, wherein the processor is arranged to determine whether the at least one of an amplitude and phase is within a predetermined range of at least one predetermined value by calculating an average of a plurality of values of the at least one of the amplitude and phase of the wireless charging signal.

16. The wireless charger of claim 9, wherein monitoring the wireless charging signal comprises receiving the wireless charging signal by a receiver that is co-located with a transmitter of the wireless charging signal.

17. A wireless charger device comprising:
    means for transmitting a wireless charging signal;
    means for monitoring at least one of an amplitude and a phase of the wireless charging signal;
    means for determining whether the at least one of an amplitude and phase is within a predetermined range of at least one predetermined value; and
    means for stopping transmission of the wireless charging signal if it is determined that the at least one of an amplitude and phase is not within the predetermined range of the at least one predetermined value.

18. A wireless charging method, comprising:
    performing a first search for devices;
    detecting a first device eligible for wireless charging during the first search for devices;

transmitting a wireless charging signal to the first device;
monitoring at least one of an amplitude and a phase of the wireless charging signal;
determining whether the at least one of an amplitude and phase is within a predetermined range of at least one predetermined value;
if it is determined that the at least one of an amplitude and phase is not within the predetermined range of the at least one predetermined value, stopping transmission of the wireless charging signal;
performing a second search for devices; and
if no devices are found that could be damaged by the wireless charging signal during the second search, resuming transmission of the wireless charging signal.

19. The method of claim 18, wherein devices that could be damaged by the wireless charging signal comprise devices that communicate at a frequency substantially equal to a frequency of the wireless charging signal.

20. The method of claim 19, wherein the wireless charging signal is transmitted at 13.56 MHz and devices that could be damaged by the wireless charging signal comprise NFC and/or RFID devices.

21. The method of claim 20, wherein the devices that could be damaged by the wireless charging signal do not include NFC and/or RFID devices that indicate that they will not be damaged by the wireless charging signal.

22. A wireless charger, comprising:
means for performing a first search for devices;
means for detecting a first device eligible for wireless charging during the first search for devices;
means for transmitting a wireless charging signal to the first device;
means for monitoring at least one of an amplitude and a phase of the wireless charging signal;
means for determining whether the at least one of an amplitude and phase is within a predetermined range of at least one predetermined value;
means for stopping transmission of the wireless charging signal if it is determined that the at least one of an amplitude and phase is not within the predetermined range of the at least one predetermined value;
means for performing a second search for devices; and
means for resuming transmission of the wireless charging signal if, during the second search, no devices are found that could be damaged by the wireless charging signal.

* * * * *